US007870672B1

(12) United States Patent
Braun

(10) Patent No.: US 7,870,672 B1

(45) Date of Patent: Jan. 18, 2011

(54) METHOD FOR MAKING A STAINLESS STEEL COMPOSITE DOOR

(76) Inventor: Tom Braun, 250 Jackson Ave., Mineola, NY (US) 11501-0767

( * ) Notice: Subject to any disclaimer, the term of this patent is extended or adjusted under 35 U.S.C. 154(b) by 1126 days.

(21) Appl. No.: 11/582,956

(22) Filed: Oct. 19, 2006

(51) Int. Cl.
*B23P 17/00* (2006.01)

(52) U.S. Cl. ................ 29/897.32; 29/897.3; 52/309.13; 52/784.1; 52/794.1

(58) Field of Classification Search .................. 29/458, 29/463, 469.5, 527.1, 527.2, 897.3, 897.31, 29/897.32; 52/784.1, 309.13, 232, 455, 794.1, 52/784.11, 783.13, 309.9; 312/138.1; 126/65; 451/41; 174/66.67; 125/1
See application file for complete search history.

(56) References Cited

U.S. PATENT DOCUMENTS 4,121,561 A * 10/1978 Cote .......................... 126/65
4,529,343 A 7/1985 Adams ...................... 409/182
5,215,134 A 6/1993 Gudeman .................. 144/144
5,570,560 A 11/1996 Thompson et al. ....... 52/784.13
5,682,935 A 11/1997 Bustamante ........... 144/144.51
7,344,433 B2 * 3/2008 Wilson ........................ 451/41

* cited by examiner

*Primary Examiner*—Rick K Chang
(74) *Attorney, Agent, or Firm*—Jacobson Holman PLLC

(57) ABSTRACT

A method of making a stainless steel composite door is accomplished by forming an oversized composite core by gluing a sheet of lightweight plywood to a sheet of brushed metallic laminate formed of a layer of metal and phenolic plastic. The thus formed core is cut to form an undercut step through only a portion of the plywood section, leaving the laminate intact. A pan is then laid down on a flat table with flanges pointing up. One-quarter inch thick spacer pads are placed in each of the four corners of the pan. The oversized metallic laminated core, with an undercut step, is placed on top of the pan and centered. Overhead clamps are tightened to hold the core in place in the pan. The metallic laminated core is routed by a trim router having a rotatable bearing and a cutting bit, with the bearing having a lesser radius than the router bit. The difference in radii between the bearing and the router bit is equal to the thickness of the flanges of the pan.

21 Claims, 8 Drawing Sheets

METHOD FOR MAKING A STAINLESS STEEL COMPOSITE DOOR

FIELD OF THE INVENTION

The present invention relates to the manufacture of a stainless steel composite door formed of a stainless steel pan and a core formed of a lightweight plywood section and a brushed metallic laminate forming a rear surface of the door.

BACKGROUND OF THE INVENTION

Renovation or new construction of kitchen cabinetry has evolved to the use of stainless steel doors as an aesthetically pleasing and durable material. The current process of manufacture for a stainless steel composite door includes the formation of a stainless steel pan filled with a core having a stainless steel exterior surface forming a rear surface of the door.

Initially, a flat sheet of stainless steel is notched at four corners to provide an approximately ¾ of an inch flange at each side of the stainless steel sheet. The side edge flanges are then folded up from the central base portion of the sheet of stainless steel.

The process of cutting a sheet of stainless steel to remove notches at the corners of the sheet, bending flanges from a horizontal to a vertical orientation and welding and polishing the corners of the fabricated metal pan always includes a series of imperfections. No matter how much care is taken during the folding process, the edges of the flanges deviate along their lengths to form an undulating pattern.

Usually, a laminate of a lightweight plywood section and a brushed metallic laminate is cut to fit into the pan with side straight edges along their length. When the straight edged laminate is inserted into the formed pan there is an apparent misalignment between the walls of the flanges of the pan and the inserted core. The appearance of gaps along the length of the flanges is apparent and unsightly.

SUMMARY OF THE INVENTION

Accordingly, it is an object of the present invention to manufacture a stainless steel door having a pan with ¾ inch flanges and a core with a laminate surface which exactly follows the contour of the flanges to provide no gaps between the flanges and the laminate forming the rear surface of the door.

This object is obtained by manufacturing a stainless steel pan by cutting notches at four corners of a flat sheet of stainless steel. The side flanges are bent upward to interengage at the corners of the thus formed pan. The corners are welded and polished to provide the appearance of a pan formed of a continuous surface of stainless steel.

An oversized composite core is formed of a sheet of lightweight plywood glued to a sheet of brushed metallic laminate formed of a layer of metal and phenolic plastic. The thus formed core is cut to form an undercut step through only a portion of the plywood section, leaving the laminate intact.

The pan is then laid down on a flat table with the flanges pointing up. One-quarter inch thick spacer pads are placed in each of the four corners of the pan. The oversized metallic laminated core, with an undercut step, is placed on top of the pan and centered. Overhead clamps are tightened to hold the core in place in the pan.

The metallic laminated core and the yet uncut portion of the plywood section is then routed by a trim router to approximate the exterior configuration of the pan. During a second routing step, a router having a rotatable bearing and a cutting router bit, with the bearing being of a lesser radius than the router bit, is used. There is a difference in the radii between the bearing and the router bit. This difference in radii is equal to the thickness of the flanges of the pan.

The trim router with an undersized bearing follows along the exterior shape of the pan, corner radius and imperfect side flange lines, cutting an exact pattern to the undulating shape of the flanges of the pan. The core is then unclamped from the pan, the spacing pads removed from the pan and the core glued into the interior of the pan. The exterior configuration of the edges of the metallic laminate of the rear surface fit exactly along the interior configuration of the side edges of the flanges, following all irregularities in the flange configuration.

Accordingly, it is another object of the present invention to form a plywood core having a brushed metallic laminate perfectly fitting the interior dimensions of a stainless steel pan.

It is yet another object of the present invention to form a plywood core having a brushed metallic laminate perfectly fitting the interior dimensions of a stainless steel pan by initially forming an undercut step in the core and routing the brushed metallic laminate with a router bit having an undersized rotatable bearing as compared to the router bit.

As still yet another object of the present invention to form a plywood core having a brushed metallic laminate perfectly fitting the interior dimensions of a stainless steel pan by initially forming an undercut step in the core and routing the brushed metallic laminate with a router bit having an undersized rotatable bearing as compared to the router bit with the differential between the radius of the bearing and the router bit being equal to a thickness of a side flange of the pan.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the METHOD FOR MAKING A STAINLESS STEEL COMPOSITE DOOR disclosed herein, and are for illustrative purposes only. Other embodiments that are substantially similar can use other components that have a different appearance.

DETAILED DESCRIPTION OF THE PREFERRED EMBODIMENTS

Figure 1:
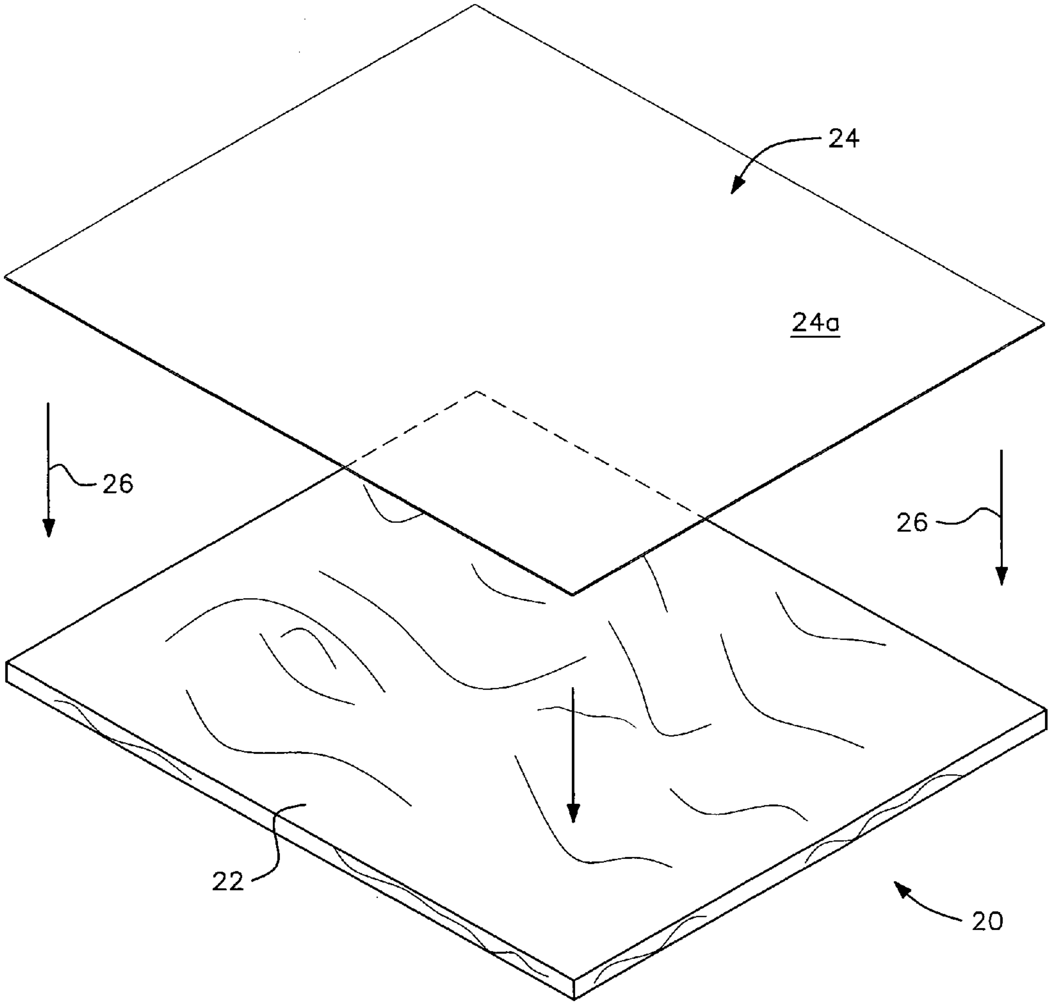
FIG. 1 is an exploded perspective view of core including a lightweight plywood section and brushed metallic laminate used to form the rear surface of the composite door.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1-5 and 8, in particular, a method for making a stainless steel composite door embodying the teachings of the subject invention is generally shown. With reference to FIG. 1, an interior core is formed by a combination of a section of plywood 22 and a laminate 24. The plywood 22 may be of a thickness of ⅝ of an inch or other appropriate thickness to fit within a pan forming the front and side walls of the door. The laminate 24 is a metallic laminate formed of a layer of metal and phenolic plastic with the metal portion **24*a* forming the upper exterior surface of the core 20**.

Figure 2:
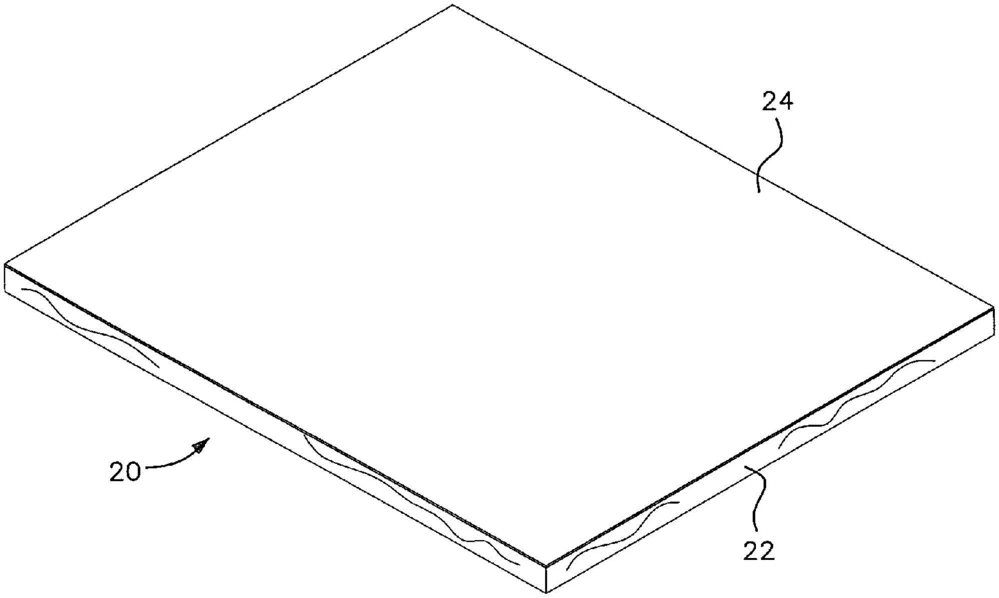
FIG. 2 illustrates the connected plywood section and laminate forming the core.

The laminate 24 is moved in the direction of arrows 26 into contact with the plywood section 22 and secured to the plywood section to form a core 20 as shown in FIG. 2. In FIG. 2, the laminate 24 is shown glued to the plywood section 22.

Figure 3:
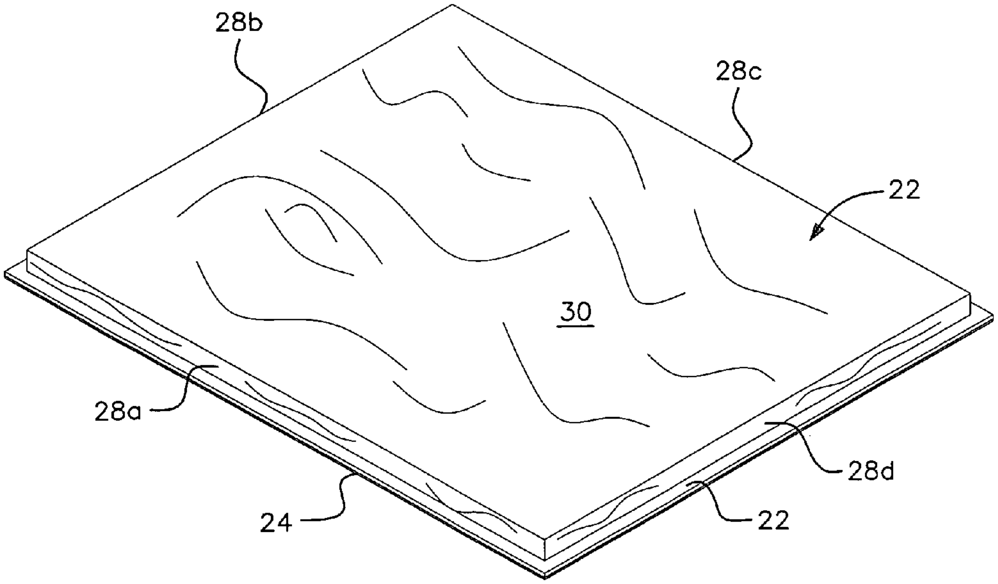
FIG. 3 illustrates forming an undercut portion in the plywood section of the core.

In FIG. 3, the core 20 is inverted so that the laminate 24 is face down. A router is used to remove a portion of the plywood section along all four side edges **28*a*, 28*b*, 28*c* and 28*d*. The portion removed extends from the bottom surface 30 of plywood 22. As shown in FIG. 3, the step or undercut formed in the plywood does not extend all the way through the plywood, but rather leaves a small portion, approximately ⅛ to ¼ of an inch of plywood, extending out to the outermost edges of the laminate 24**.

Figure 4:
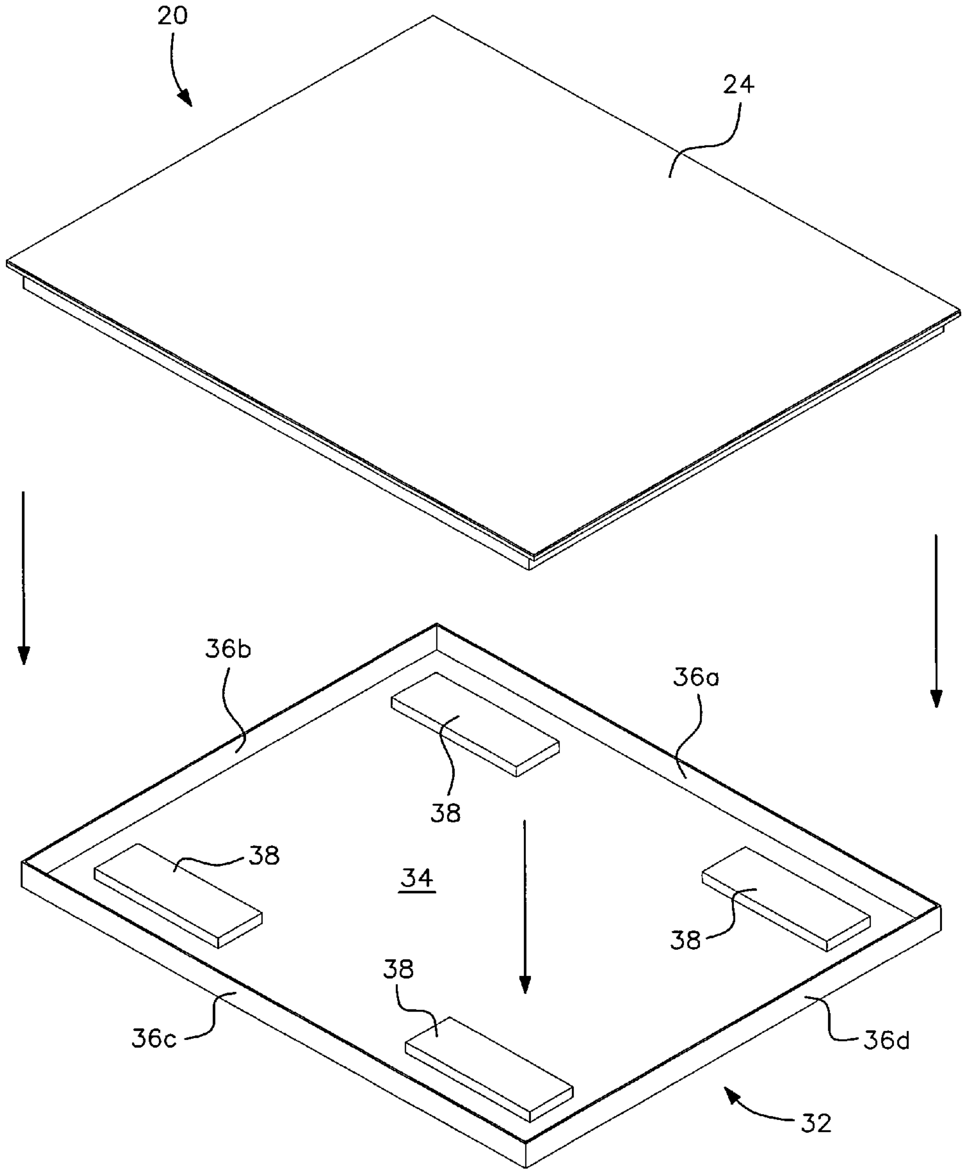
FIG. 4 illustrates the placement of the undercut core into the interior of a pan having a series of spacers located at the corners of the pan.

In FIG. 4, a stainless steel pan 32 is shown having a central flat base portion 34 surrounded by flange portions **36*a*, 36*b*, 36*c* and 36*d*. The flange portions extend vertically from the base portion 34** for approximately ¾ of an inch.

Placed on the four corners of the interior of the pan 32 are spacing pads 38. Pads 38 are approximately ¼ inch thick and may be made of compressible or noncompressible material.

Core 20 is lowered into place in the pan with the undercut step extending into the interior of the pan 32, while having the laminate layer 24 and a portion of the plywood section 22 extending beyond the peripheral edges of flanges **36*a*, 36*b*, 36*c* and 36*d*. The core 20 is clamped in place with respect to the pan 32 so that the core 20** does not shift during the subsequent cutting operations.

Figure 5:
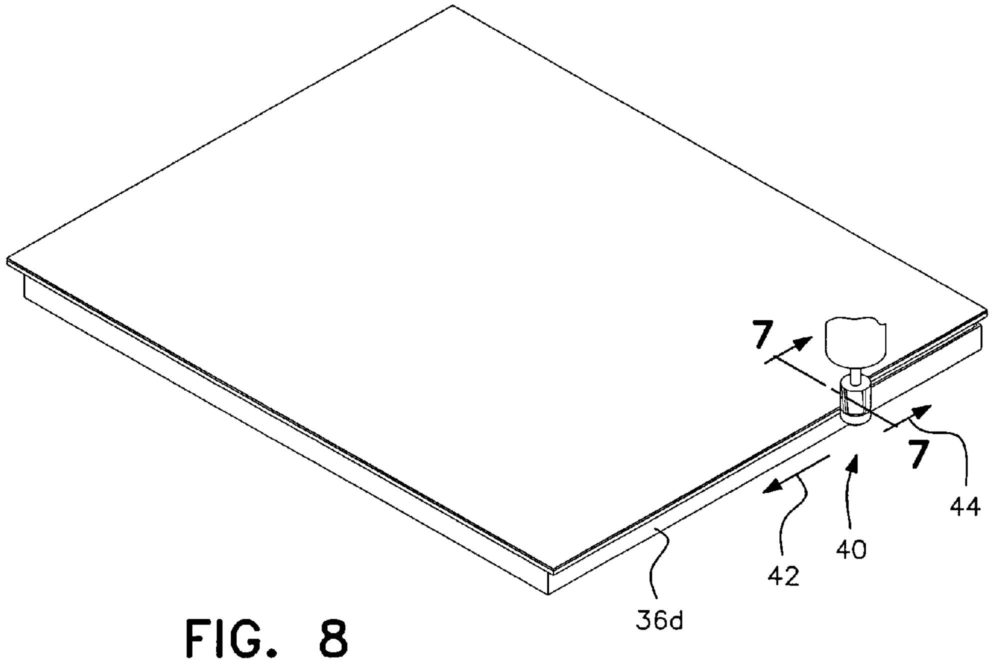
FIG. 5 illustrates an initial routing of the edges of the core to approximate the overall size of the pan.
Figure 6:
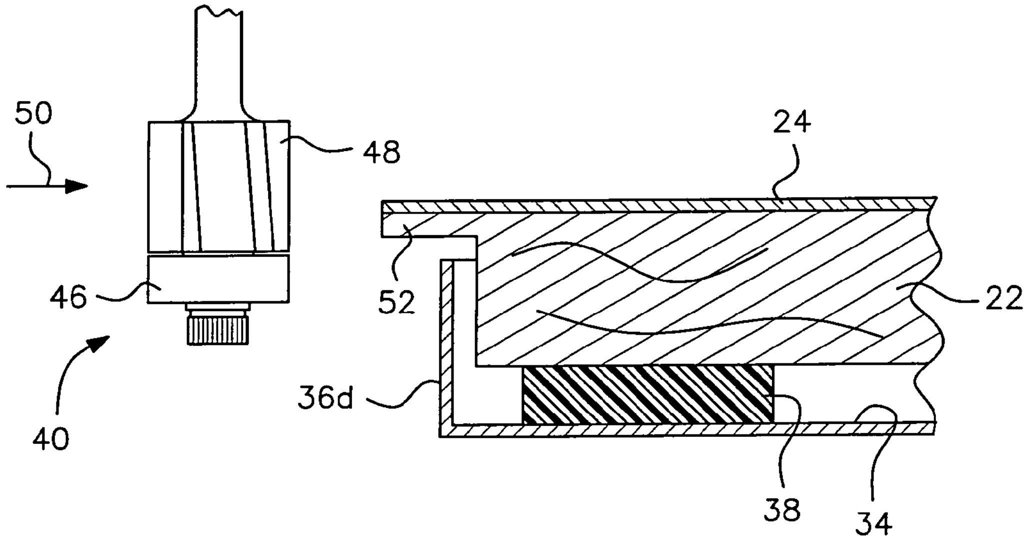
FIG. 6 illustrates the approach of the initial trim router to the undercut core.
Figure 7:
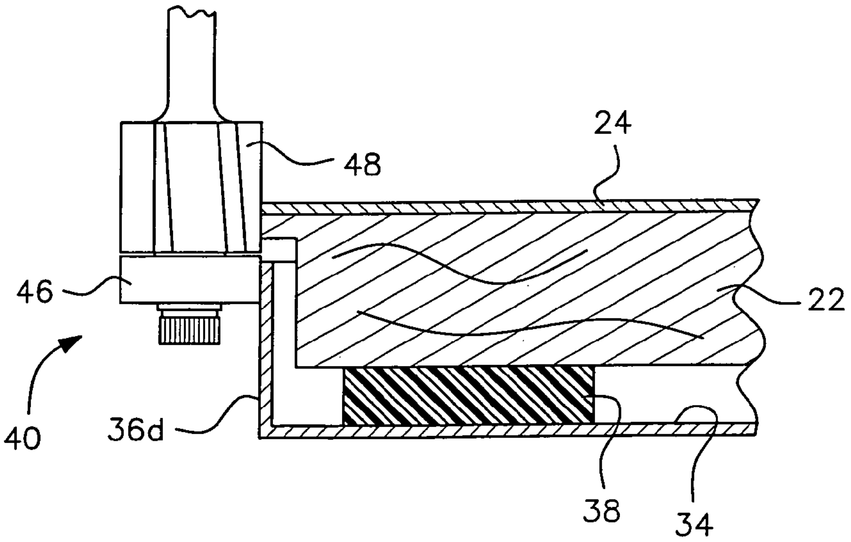
FIG. 7 illustrates the cutting of the core to approximate the exterior dimensions of the pan.

As shown in FIGS. 5 though 7, a router 40 is passed along the exterior edges of the flanges **36*a*, 36*b*, 36*c* and 36*d* in the direction of arrows 42, 44 to remove a portion of the core extending beyond the exterior edges of the flanges. As shown in FIG. 6, the router bit 40 includes a rotatable bearing 46 and a router bit 48. The radius of the bearing 46 and bit 48 are equal. The router 40 is moved in the direction of arrow 50 toward engagement with the laminate 24 and portion 52 of the plywood 22 which was not previously undercut. As shown in FIG. 7, the router 40 is rotated as the router bit 48 is moved along the exterior edges of the flanges 36*a*, 36*b*, 36*c* and 36*d* with the bearing 46 contacting the exterior surface of the flanges. The bit 48 cuts a projecting portion of the laminate and portion 52 of the plywood section 22**.

Figure 8:
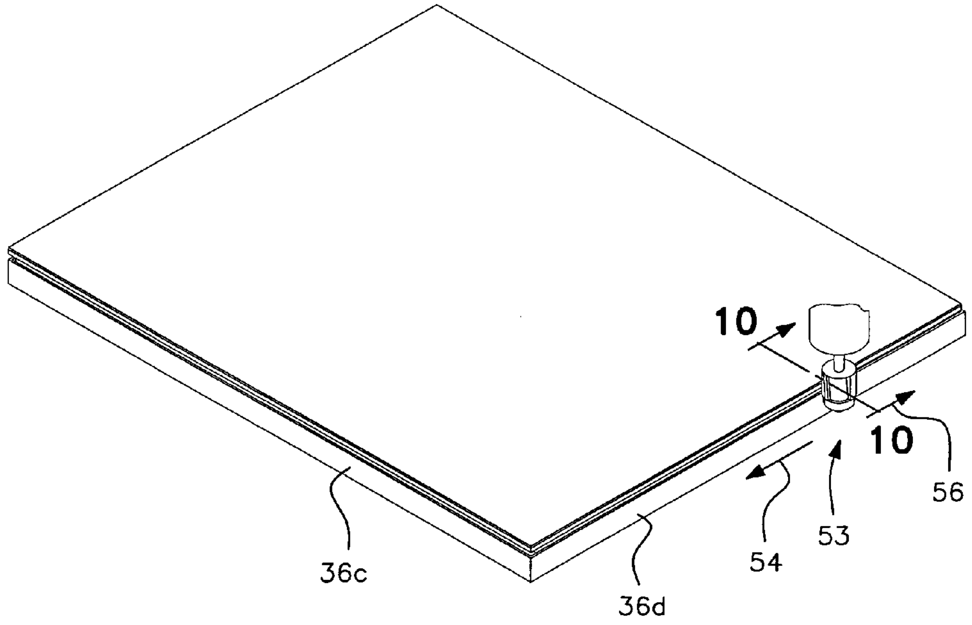
FIG. 8 illustrates the second and final routing of the core to equal the interior configuration dimensions of the pan.
Figure 9:
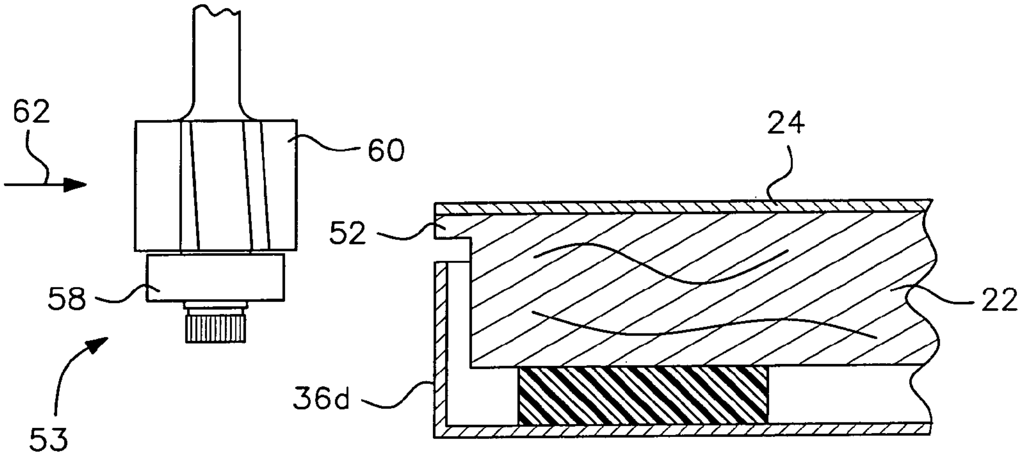
FIG. 9 illustrates the initial approach of the undersized bearing router.
Figure 10:
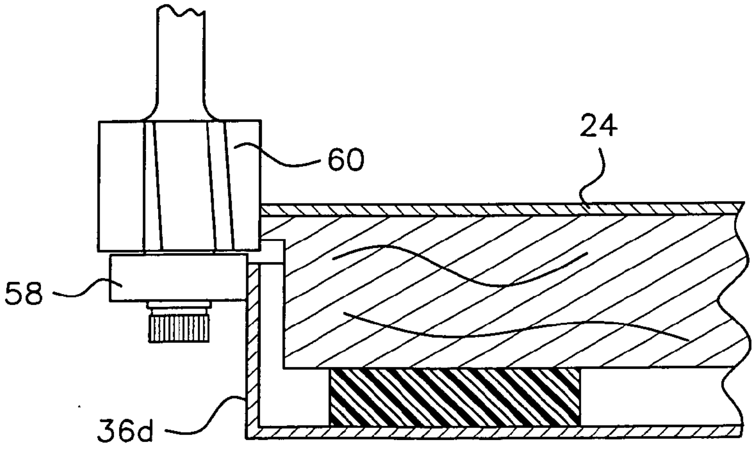
FIG. 10 illustrates the cutting of the core to the exact configuration of the flanges and to an interior dimension between the flanges.

As shown in FIGS. 8 through 10, after the initial router pass as shown in FIGS. 5 through 7, a router 53 is passed around the exterior surface of the flanges in the direction of arrows 52, 54. As shown in more detail in FIGS. 9 and 10, the router 53 includes a rotatable bearing 58 and a router bit 60. A radius of the rotatable bearing 58 is less than a radius of router bit 60. The difference in radii between the rotatable bearing 58 and router bit 60 is equal to a thickness of each of the flanges **36*a*, 36*b*, 36*c* and 36*d*. The router 53 is moved in the direction of arrow 62** towards the previously routed core.

The rotatable bearing 58 as shown in FIG. 10, contacts the exterior of the flange **36*d*. The stepped portion 52 of plywood section 22 along with the laminate 24 are engaged by the router bit 60 to remove a portion of the undercut step portion 52 and laminate 24** equal to the thickness of the flanges.

By the rotatable bearing 58 engaging the exterior surface of the flanges, the router 53 will follow the contour of the exterior surface of the flanges. The router 53 moves in and out towards and away from the core 20 dependent upon the exact configuration of the flanges.

Figure 11:
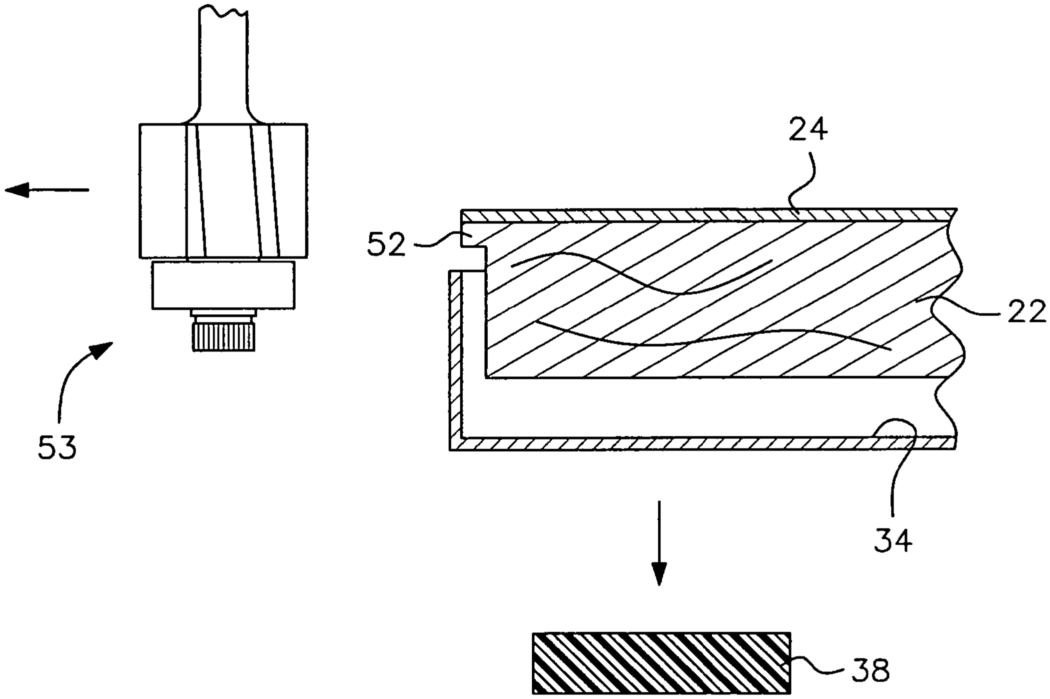
FIG. 11 illustrates the final appearance of the core after the second router has passed and removal of the spacers from the pan.
Figure 12:
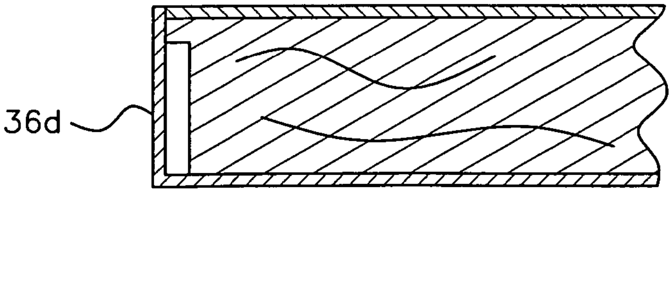
FIG. 12 illustrates the close fit of the core to the interior configuration of the pan.
Figure 13:
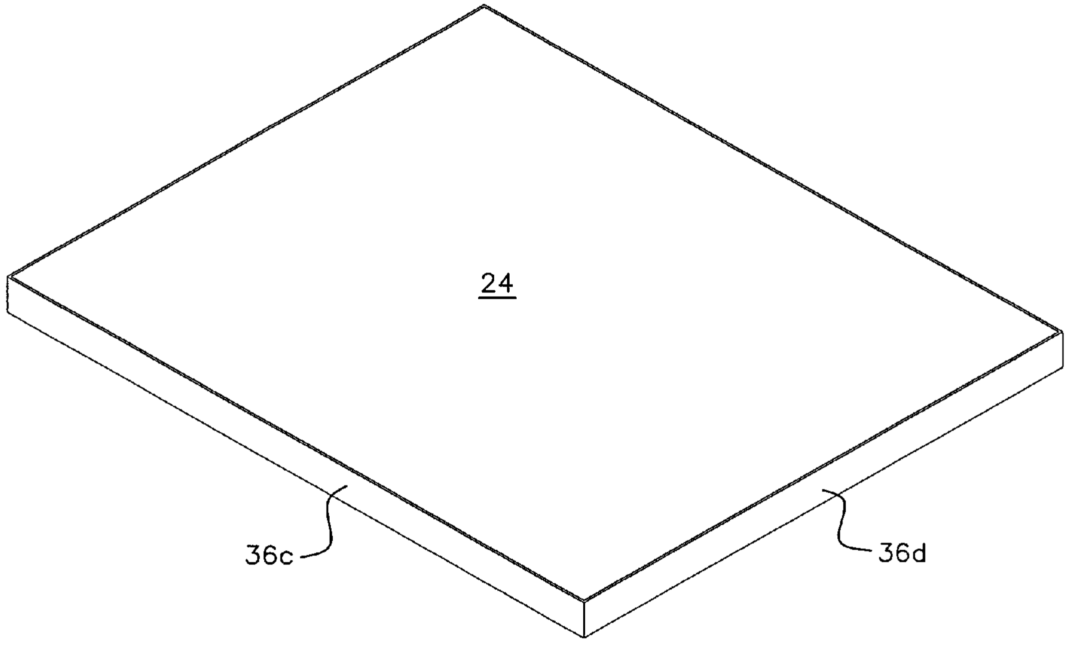
FIG. 13 illustrates the rear view of the final product of a composite door with the rear surface of the door, formed by the core, fitting exactly into the interior of the pan which forms the front and the side walls of the door.

As shown in FIG. 11, the router 53 is removed after passing around the entire exterior of the pan 32. The spacers 38 are removed and the core is inserted into the pan and secured in place by glue or other means. The exterior configuration of the laminate 24 and the undercut portion 52 of the plywood section 22 fit exactly to the interior configuration of the flanges as shown in FIG. 12 with respect to flange **36*d* and in FIG. 13 with respect to all of the flanges 36*a*, 36*b*, 36*c* and 36*d*. Therefore, any imperfections in the contours of the flanges have been accommodated by the router 53 following the configuration of the flanges and removing the portion of the laminate 24 and undercut portion 52 of the plywood section 22 to exactly fit, engage, and mate with the interior of the flanges forming the pan 32**.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A method of making a composite door, said method comprising the steps of:

forming a pan having a base and upstanding flanges surrounding the base, forming a core of a base layer and a laminate layer, placing the core in the pan spaced from the base, cutting an exact exterior configuration of the core to an exact interior configuration of the upstanding flanges, securing the core in the pan to form the composite door, undercutting the core prior to placement in the pan to form a stepped portion of the base layer, and initially cutting the stepped portion and the laminate layer to approximate an exterior configuration of the flanges.

2. The method of making a composite door as claimed in claim 1, wherein the base layer is wood.

3. The method of making a composite door as claimed in claim 1, wherein the exact exterior configuration of the core is cut with a router.

4. The method of making a composite door as claimed in claim 3, wherein the router includes a rotatable bearing engaging the flanges and a router bit engaging lateral surfaces of the core.

5. The method of making a composite door as claimed in claim 4, wherein a radius of the rotatable bearing is less than a radius of the router bit.

6. The method of making a composite door as claimed in claim 5, wherein a difference in the radius of the rotatable bearing and the radius of the router bit is equal to a thickness of the upstanding flanges.

7. The method of making a composite door as claimed in claim 1, wherein the pan and an exterior surface of the laminate layer are formed of metal.

8. The method of making a composite door as claimed in claim 7, wherein the pan is stainless steel.

9. A method of making a door, said method comprising the steps of:

forming a pan having a base and upstanding flanges surrounding the base, forming a core of a wood layer and a laminate layer, placing the core in the pan spaced from the base, cutting lateral edges of the core to approximate an exterior configuration of the upstanding flanges, cutting an exact exterior configuration of the core to an exact interior configuration of the upstanding flanges, and securing the core in the pan to form the composite door.

10. The method of making a composite door as claimed in claim 9, wherein the core is undercut prior to placement in the pan to form a stepped portion of the wood layer.

11. The method of making a composite door as claimed in claim 10, wherein the base layer is plywood.

12. The method of making a composite door as claimed in claim 10, wherein the stepped portion and the laminate layer are initially cut by a router to approximate an exterior configuration of the flanges.

13. The method of making a composite door as claimed in claim 9, wherein the exact exterior configuration of the core is cut with a router.

14. The method of making a composite door as claimed in claim 13, wherein the router includes a rotatable bearing engaging the flanges and a router bit engaging lateral surfaces of the core.

15. The method of making a composite door as claimed in claim 14, wherein a radius of the rotatable bearing is less than a radius of the router bit.

16. The method of making a composite door as claimed in claim 15, wherein a difference in the radius of the rotatable bearing and the radius of the router bit is equal to a thickness of the upstanding flanges.

17. The method of making a composite door as claimed in claim 9, wherein the pan and an exterior surface of the laminate layer are formed of metal.

18. The method of making a composite door as claimed in claim 17, wherein the pan is stainless steel.

19. A method of making a composite door, said method comprising the steps of:

forming a pan having a base and upstanding flanges surrounding the base, forming a core of a base layer and a laminate layer, placing the core in the pan spaced from the base, cutting an exact exterior configuration of the core to an exact interior configuration of the upstanding flanges, securing the core in the pan to form the composite door, and cutting the exact exterior configuration of the core with a router, and the router including a rotatable bearing engaging the flanges and a router bit engaging lateral surfaces of the core.

20. The method of making a composite door as claimed in claim 19, wherein a radius of the rotatable bearing is less than a radius of the router bit.

21. The method of making a composite door as claimed in claim 20, wherein a difference in the radius of the rotatable bearing and the radius of the router bit is equal to a thickness of the upstanding flanges.

* * * * *